United States Patent [19]
Joshi

[11] Patent Number: 5,833,067
[45] Date of Patent: Nov. 10, 1998

[54] DISK CADDY AND LID WITH BARRIER MEANS

[75] Inventor: Shailendra Mulshanker Joshi, San Jose, Calif.

[73] Assignee: Seagate Technologies, Inc., Scotts Valley, Calif.

[21] Appl. No.: 814,119

[22] Filed: Mar. 10, 1997

[51] Int. Cl.⁶ .................................................. B65D 85/48
[52] U.S. Cl. .......................................... 206/454; 206/711
[58] Field of Search .................................. 206/454, 445, 206/711, 213.1

[56] References Cited

U.S. PATENT DOCUMENTS

| | | | |
|---|---|---|---|
| Re. 33,361 | 10/1990 | Coe | 206/711 X |
| 4,135,675 | 1/1979 | Merrill | 206/445 |
| 4,588,086 | 5/1986 | Coe | 206/711 X |
| 4,718,552 | 1/1988 | Rossi et al. | 206/454 X |
| 4,721,207 | 1/1988 | Kikuchi | 206/454 X |
| 4,747,488 | 5/1988 | Kikuchi | 206/454 X |
| 4,773,537 | 9/1988 | Kikuchi | 206/454 X |
| 4,817,799 | 4/1989 | Gregerson et al. | 206/445 |
| 5,046,615 | 9/1991 | Nentl et al. | 206/454 |
| 5,472,086 | 12/1995 | Holliday et al. | 206/711 |

Primary Examiner—Bryon P. Gehman
Attorney, Agent, or Firm—Fliesler Dubb Meyer & Lovejoy LLP

[57] ABSTRACT

A disk caddy is disclosed which prevents particles generated during the process of securing a disk caddy lid to a disk caddy housing from reaching a stored disk. The disk caddy includes a barrier extension, which extends from the lid in one embodiment of the invention. The barrier extension is located towards the end of the lid and, in one embodiment, inserts into a slot in the housing which is otherwise intended to receive a disk.

12 Claims, 5 Drawing Sheets

DISK CADDY AND LID WITH BARRIER MEANS

BACKGROUND OF THE INVENTION

1. Field of Invention

The invention relates to a computer disk storage and transporting caddy.

2. Related Art

Disks in computer disk drives, e.g., hard disk drives, spin at high rates of speed (e.g., 3600–10,000 RPM). Generally, data is written to/read from a disk by a head mechanism. As the disk spins, the head typically flies over the disk on a small cushion of air of approximately 1.5 pm. Thus, any surface contamination on a disk could cause the head to crash. For example, if a particle gets between the head and the disk, the particle could cause the disk to drag with the head, could cause scratches in the disk, or could cause other variations, such as bounce, in the head's flying behavior. Therefore, disks must be kept particle and contamination free.

In efforts to keep particles and other contamination away from disks, disks are manufactured in a clean room, e.g., one which has few to no particles in the surrounding air. Unfortunately, the disk drives are usually not assembled in the same location as the disks themselves are manufactured. Therefore, the disks must be transported to the disk drive assembly area in a manner which protects the disks and keeps them particle free.

One way of transporting disks is in a disk caddy, such as that shown in FIG. 1. Disk caddy assembly 100 in FIG. 1 includes housing 102 having slots 104 for receiving disks 106 and a lid 120. Housing 102 and lid 120 are designed so that when lid 120 is secured to housing 102, lid 120 and housing 102 cooperate to form a seal such that few if any additional particles can get inside the assembly 100.

To secure the lid and to aid in forming a tight seal, lid 120 has extension regions 122 on both of the lid's ends. The extension regions 122 include small, tooth-like protrusions 124 on the inside, lower end of each extension 122. Extension regions 122 also each include an indented region 126. When the lid 120 is secured to the housing 102, the teeth-like protrusions 124 are snapped under ledge 114 of housing 102 while the indented regions 126 of extension 122 rests on top of ledge 114.

Unfortunately during the securing process, placing the teeth-like protrusions 124 beneath ledge 114 causes the lid 120 to rub against the housing 102, particularly the horizontal region 125, which forms indented region 126, rubs against ledge 114. This rubbing causes portions of lid 120 to shred, creating loose particles within the housing 102. These loose particles come into contact with the disks 106, and particularly with the disks placed closest to the respective ends 116 of the housing 102, e.g., in slots 104a and 104b.

One common solution to the lid shredding problem is to place dummy disks, i.e., disks (often rejected) which are not intended for use in a disk drive, into the first slot 104a and last slot 104b of housing 102. Thus, the dummy disks serve to block particles created during the securing of the lid 120 to the housing 102 from contaminating the "good" disks.

Use of dummy disks, however, has its own problems, mostly due to human error. Particularly, when the disk caddy full of disks arrives at the disk drive assembly center, the dummy disks inserted into the caddy for protection are often mistakenly inserted into the disk drives. The mistaken insertion of dummy disks into the drive often causes the drive to be unreliable and/or useless. Other human errors occur when the human responsible for loading the caddy fails to insert the dummy disks or inserts "good" disks instead. Each of these errors causes overall production levels of disks and disk drives by a disk drive manufacturer to decrease and/or reduces the reliability of the disk drives produced. Nonetheless, the disk drive industry has used this "dummy disk" procedure for years.

Therefore, to address a long felt need, a new caddy assembly design, which keeps particles out and prevents particles generated during the securing of the lid to the housing from reaching the disks, is desired.

SUMMARY OF THE INVENTION

To overcome the problems discussed above, a disk caddy ais disclosed which prevents particles generated during the securing of the lid to the housing from reaching a stored disk. Specifically, a disk caddy in accordance with the invention includes a housing and a lid. The housing has slots for receiving disks to be stored and/or transported, and the lid has securing means for securing the lid to the housing, generally to prevent external particles from reaching the stored disks. In addition, the disk caddy includes a barrier means, which is fixedly attached to the disk caddy for blocking particles generated while securing the lid to the housing. In one embodiment, the barrier means is a roughly disk-shaped extension from the lid, which is received by a slot in the housing when the lid is secured to the housing.

An apparatus in accordance with the invention is advantageous in that it minimizes mistakes caused by human error in transporting the disks from the disk manufacturing location to the disk drive assembly area. By minimizing such mistakes, the yields of reliable disks and disk drives will ultimately increase.

BRIEF DESCRIPTION OF THE DRAWINGS

The present invention is described with respect to particular exemplary embodiments thereof and reference is accordingly made to the drawings (which are not necessarily drawn to scale) which like reference numbers denote like parts, in which.

DETAILED DESCRIPTION

Figure 1:
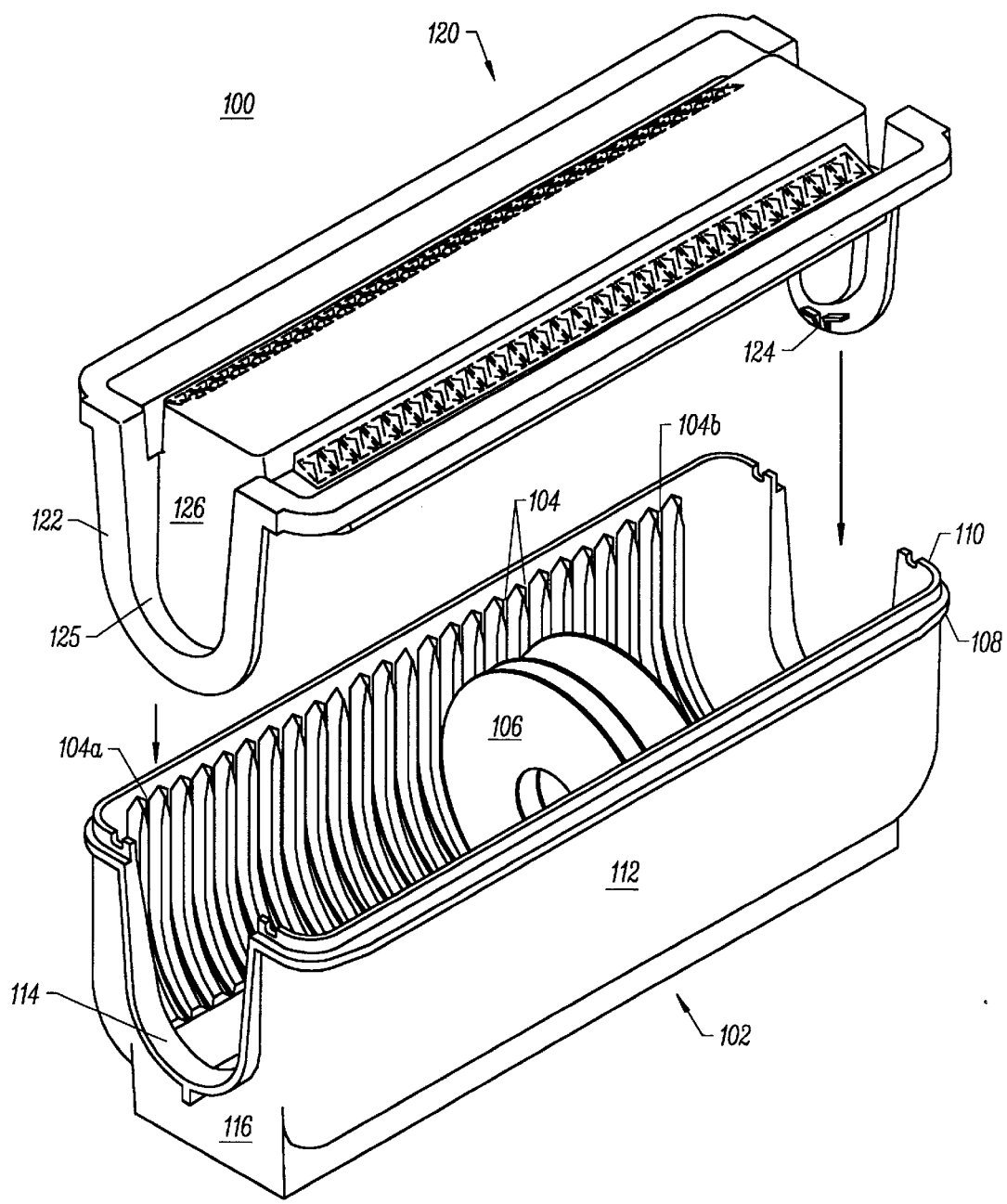
FIG. 1 is a three-dimensional representation of a disk caddy.
Figure 2:
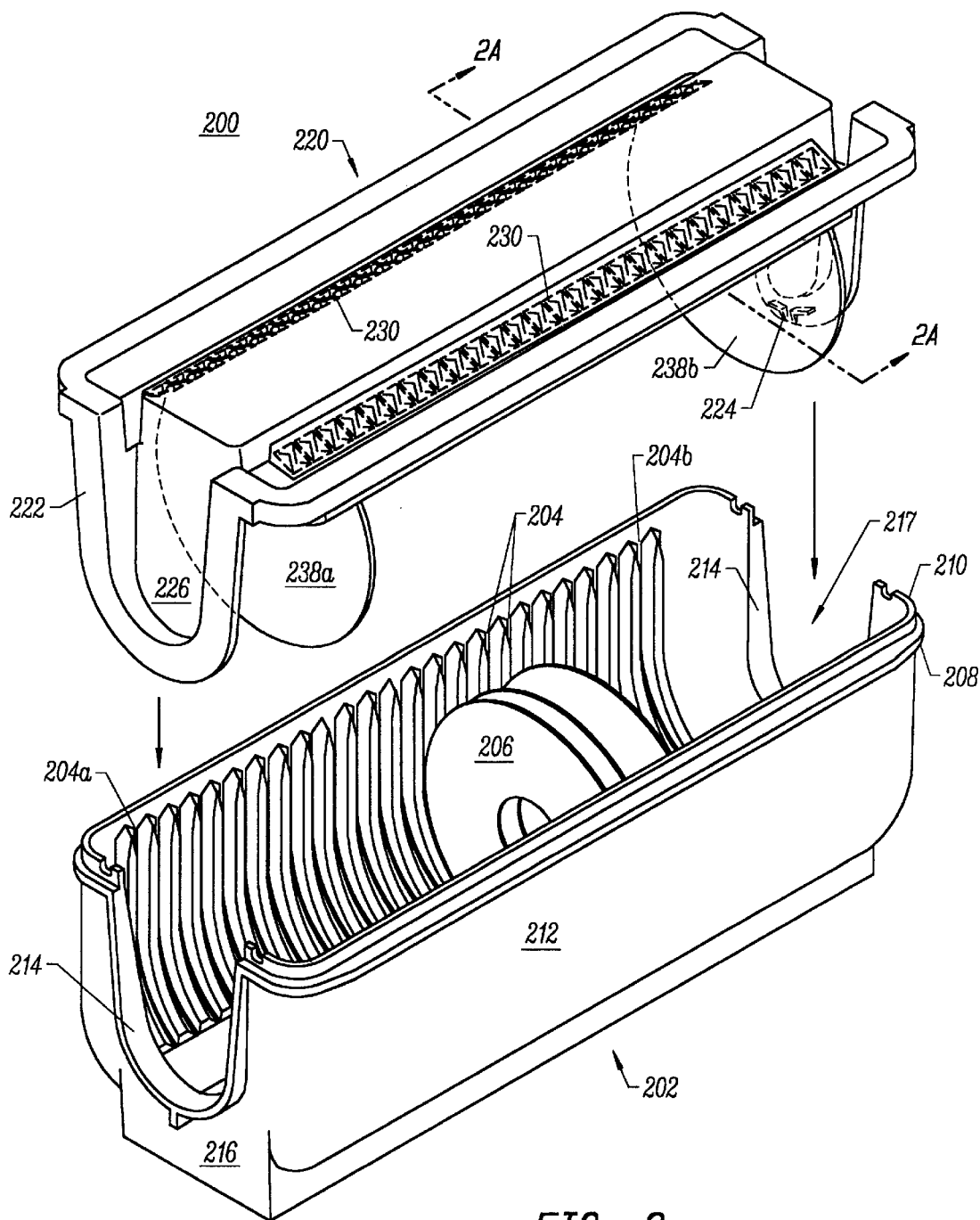
FIG. 2 is a three-dimensional representation of a disk caddy in accordance with the invention.
Figure 2A:
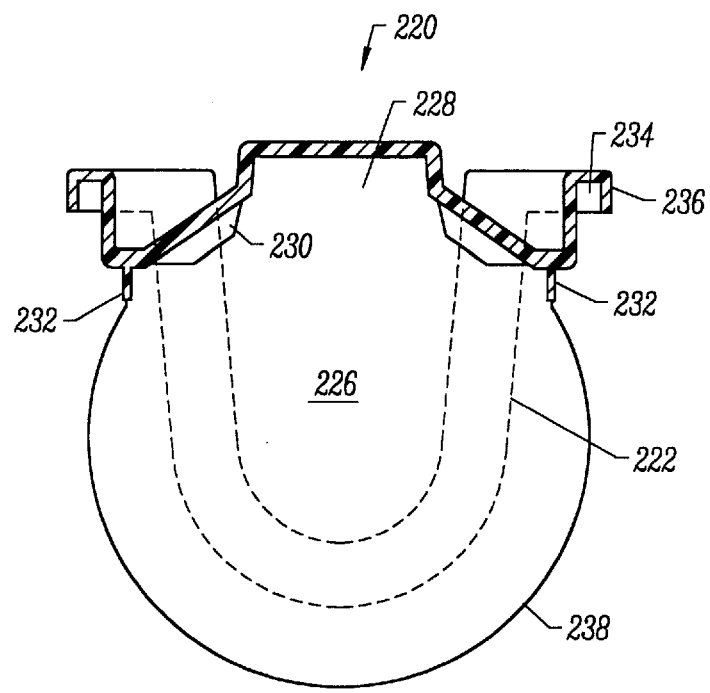
FIG. 2A is a cross-sectional view of a lid for a disk caddy in accordance the invention.
Figure 3:
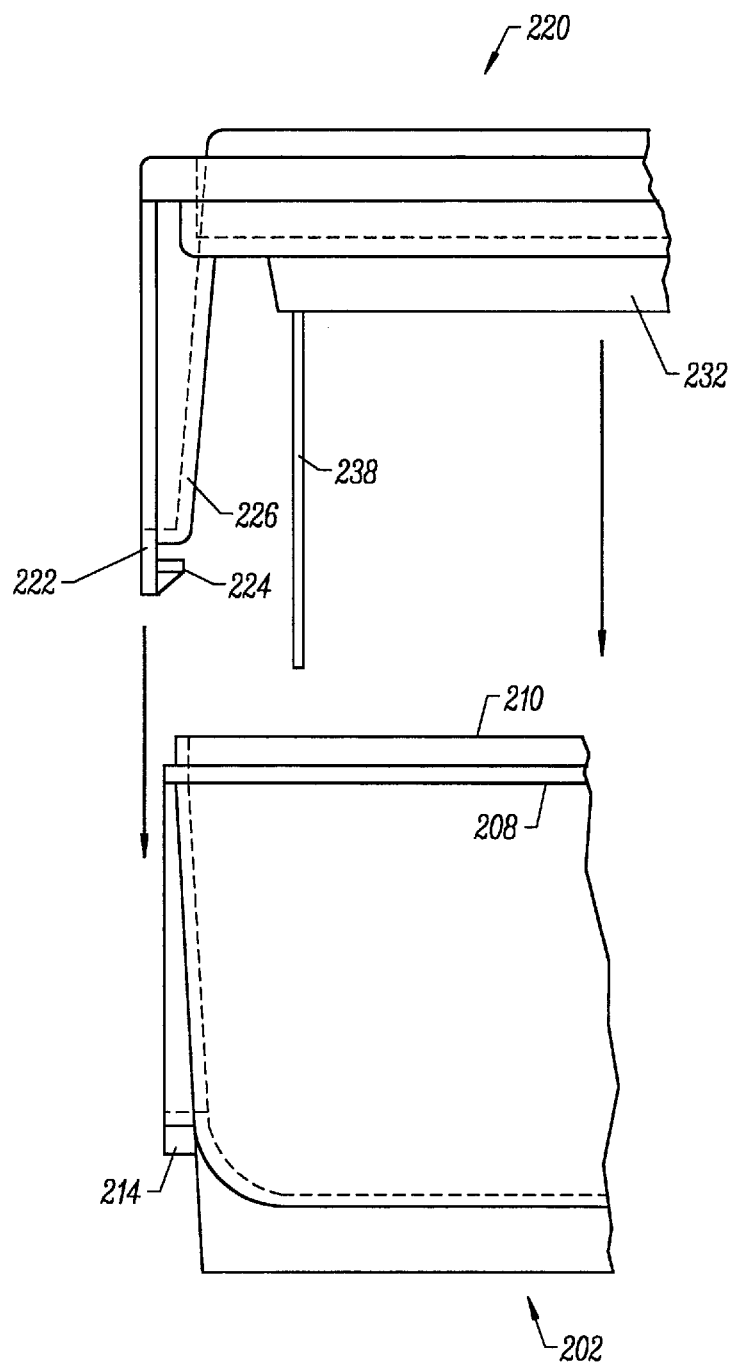
FIG. 3 is a side view of a portion of a lid and portion of a housing in accordance with the invention.
Figure 4:
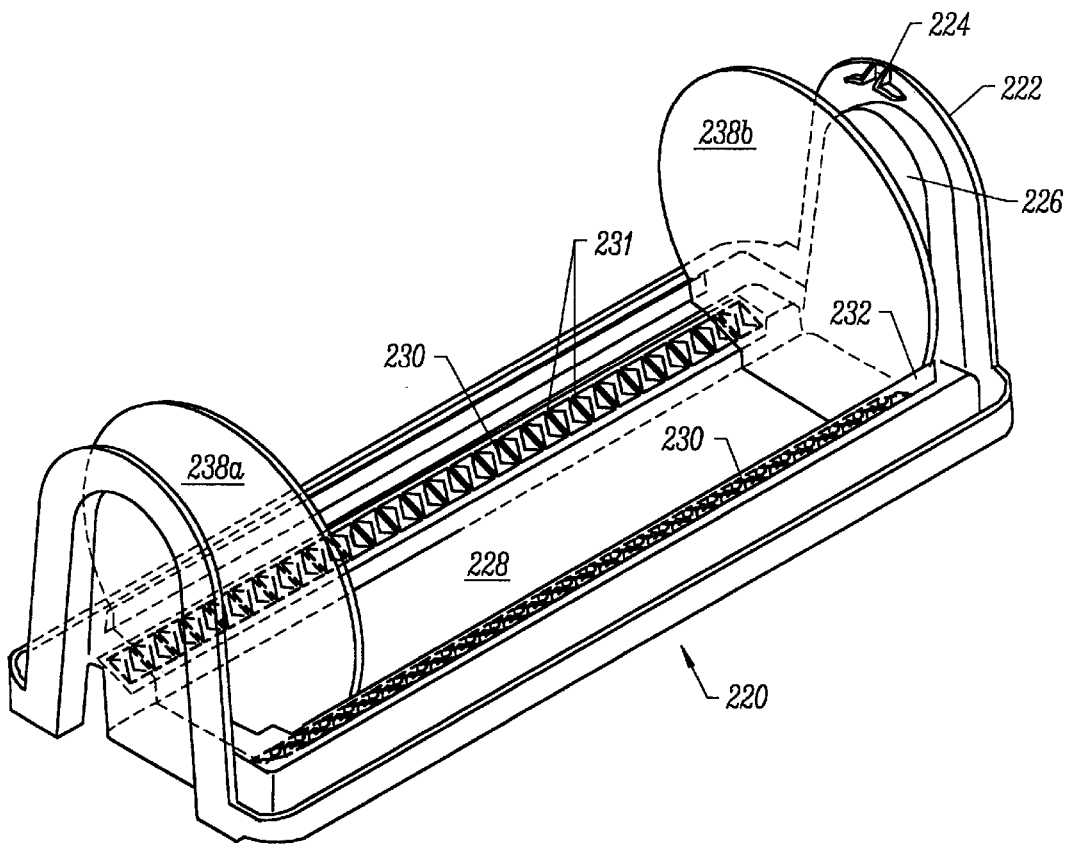
FIG. 4 is a three-dimensional representation of the underside of a lid for a disk caddy in accordance with the invention.

Referring to FIGS. 2–4, a disk caddy assembly in accordance with the invention and which overcomes problems caused by the generation of particles during the securing of a lid to a housing is described. Specifically, disk caddy assembly 200 includes housing 202, which is an elongated, rectangular box-like structure having elongated sides 212 and shorter ends 216. On the inside surface of housing 202 are formed slots 204 which are integral with housing 202 and hold disks 206 within housing 202. In one embodiment, a portion of each short end 216 is removed to form a U-shaped aperture 217 in each short end 216. The aperture 217 extends to the rim 210 of the housing 202. U-shaped aperture 217 aids in loading and unloading the disks from the caddy: e.g., a tubular structure can be inserted through the holes in the center of the disks 206, and the disks 206 can simultaneously be removed or inserted into the caddy. Extending from housing 202 where the housing forms the boundaries of aperture 217 is a ledge 214. In one embodiment, a ledge 208 is also formed near rim 210 and extends the length of each elongated side 212 of housing 202 and partially along the ends 216 to meet ledge 214. Ledge 208 is integral with housing 202. Housing 202 is generally formed of polycarbonate, but other materials, including static dissipating materials, are also suitable in other embodiments of the invention.

Lid 220 is an elongated rectangular form having similar rectangular dimensions in one plane as caddy 202. Lid 220 has two end extensions 222 which have teeth-like protrusions 224 extending inwardly from the lower portion of end extensions 222. Further, end extensions 222 have an inwardly indenting region 226.

The lid 220 is secured to the housing 202 by snapping the teeth-like protrusions 224 beneath ledge 214. When secured, rim 210 is received in channel 234, and lip 236 of lid 220 rests on ledge 208 of housing 202. The indented region 226 of each end extension 222 rests on ledge 214 of housing 202. In this manner, a seal is formed to prevent outside particles from entering into the caddy assembly 200. Those skilled in the art will recognize that structures other than those described can be implemented with the housing and lid that will also cooperate with each other to form a seal. For instance, rather than ledges 208 and 214, structures on the lid 220 such as channel 234 and lip 236 may cooperate solely with rim 210 or other edges to form a seal.

In addition, lid 220 has two parallel series of teeth 230. When lid 220 is secured to housing 202, the gaps 231 between teeth 230 align with slots 204 in the housing 202 and receive a portion of the disks, while reservoir 228 receives the uppermost curvature of the disks. Stabilizer extensions 232 serve to stabilize the disks, preventing movement.

In addition, lid 220 has barrier extensions 238 (238*a* and 238*b*) extending downward from lid 220. Each barrier extension 238 is designed to roughly have the same width as the diameter of a disk 206. Further, each barrier extension 238 is fixedly attached to the lid 220, and in one embodiment is integral with the lid 220, such that when the lid is secured to the housing 202, barrier extensions 238*a* and 238*b* slide into slots 204*a* and 204*b*, the first and last slots in the housing 202, respectively. Thus, when end extensions 222 are snapped into place, particles that are generated by the securing process are blocked by barrier extensions 238 from reaching the disks.

In other embodiments of the invention, barrier extensions 238 are fixed to housing 202 rather than lid 220. In either case (extensions 238 fixed to the lid 220 or housing 202), those skilled in the art will recognize that alternative placements of the extensions 238 will also perform the necessary barrier function. For instance, extension 238*a* can be placed to the left of teeth 230 and extension 238*b* can be placed to the right of teeth 230 on lid 220 so that neither extension is received by a slot 204 when the lid 220 is secured to the housing. Moreover, alternative shapes of the extension regions 238 will also be useful in other embodiments of the invention provided such shapes effectively block particles generated in the lid securing process.

In one embodiment, lid 220 is made of polypropylene, which is softer and more flexible than polycarbonate (the material generally used to form the housing), enabling the formation of a good seal. However, other materials will also be suitable in other embodiments of the invention. In addition, it should be clear that a disk caddy assembly in accordance with the invention can be modified to carry any number of disks, i.e., more or fewer slots can be contained in a disk caddy assembly than those depicted.

The advantages of a disk assembly in accordance with the invention will be recognized by those with skill in the art over traditional use of dummy disks to protect good disks from particle contamination. For instance, a disk caddy assembly in accordance with the invention is advantageous in that it eliminates human error in the disk transport process, e.g., failure to insert dummy disks, installing dummy disks into a disk drive, or inserting good disks into the dummy disk locations in the disk caddy. Thus, in the manufacturing process, the yield of reliable and useful disks and disk drives will increase by using a device in accordance with the present invention.

It should be understood that the particular embodiment described above is only illustrative of the principles of the present invention and various modifications could be made by those skilled in the art without departing from the scope and spirit of the invention. Thus, the scope of the present invention is limited only by the claims that follow.

What is claimed is:

1. An apparatus for storing a disk, comprising: a housing, having a slot capable of receiving the disk;

a lid, having securing means for securing the lid to the housing, wherein upon securing the lid to the housing said lid and said housing form a sealed enclosure; and barrier means within the sealed enclosure and fixedly attached to the apparatus for blocking particles generated from securing the lid to the housing from reaching the disk.

2. The apparatus of claim 1, wherein the barrier means is fixedly attached to the lid.

3. The apparatus of claim 2, wherein the barrier means extends downward from the lid, and wherein, upon securing the lid to the housing, the barrier means is received by the slot.

4. The apparatus of claim 3, wherein:

the housing includes an edge; and the securing means includes a securing extension from the lid for placement adjacent to the edge.

5. The apparatus of claim 1, wherein the barrier means is fixedly attached to the housing.

6. An apparatus for storing a plurality of disks, comprising:

a housing, having a plurality of slots each capable of receiving a disk, said housing further having a sealing edge;

a lid, having a securing extension to removably and sealingly secure the lid to the housing by at least partially surrounding the sealing edge, wherein upon securing the lid to the housing said lid and said housing form a sealed enclosure; and a barrier within said sealed enclosure and fixedly attached to the apparatus to block particles resulting from securing the lid to the housing from reaching the disks.

7. The apparatus of claim 6, wherein the barrier is fixedly attached to the lid and extends downward from the lid.

8. The apparatus of claim 7, wherein upon securing the lid to the housing, the barrier is received by one of the slots.

9. The apparatus of claim 6, wherein the barrier is fixedly attached to the housing.

10. The apparatus of claim 6, wherein the sealing edge is a ledge extending outwardly from said housing.

11. A disk caddy lid for use with a disk caddy housing having a plurality of slots, where each of said plurality of slots is capable of receiving a respective disk, comprising:

securing means for securing the lid to the housing thereby forming an enclosure; and barrier means within said enclosure and fixedly attached to the lid for blocking particles generated from securing the lid to the housing from reaching the disks.

12. The disk caddy lid of claim 11, wherein, upon securing the lid to the housing, the barrier means is received by one of the slots.

* * * * *